US008611916B2

(12) United States Patent
Gao

(10) Patent No.: US 8,611,916 B2
(45) Date of Patent: Dec. 17, 2013

(54) REFERENCE SIGNAL DESIGN FOR DISTRIBUTED ANTENNA SYSTEMS

(75) Inventor: Long Gao, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/191,289

(22) Filed: Jul. 26, 2011

(65) Prior Publication Data

US 2013/0029655 A1   Jan. 31, 2013

(51) Int. Cl.
*H04W 72/00* (2009.01)

(52) U.S. Cl.
USPC ......... 455/452.1; 455/418; 455/561; 370/329

(58) Field of Classification Search
USPC .................. 455/452.1, 418, 561; 370/329
See application file for complete search history.

(56) References Cited

U.S. PATENT DOCUMENTS

| 7,054,593 | B2* | 5/2006 | de La Chapelle et al. ... 455/13.4 |
| 7,639,984 | B2* | 12/2009 | Uwano et al. ................ 455/63.1 |
| 2008/0045272 | A1 | 2/2008 | Wang et al. |
| 2008/0205348 | A1 | 8/2008 | Malladi |
| 2009/0103486 | A1* | 4/2009 | Hunukumbure et al. ..... 370/329 |
| 2009/0175324 | A1* | 7/2009 | Sampath et al. .............. 375/222 |
| 2009/0268686 | A1* | 10/2009 | Yamada et al. ............... 370/330 |
| 2010/0075706 | A1 | 3/2010 | Montojo et al. |
| 2010/0296591 | A1* | 11/2010 | Xu et al. ....................... 375/259 |
| 2011/0002309 | A1 | 1/2011 | Park et al. |
| 2011/0205930 | A1* | 8/2011 | Rahman et al. ............... 370/252 |
| 2011/0211569 | A1* | 9/2011 | Koivisto et al. ............... 370/345 |

OTHER PUBLICATIONS

Round-robin scheduling. Wikipedia. Wikimedia Foundation, Inc., accessed Jul. 21, 2011, http://en.wikipedia.org/wiki/Round-robin.
3GPP A Global Initiative, 3GPP Specification detail, accessed Jul. 21, 2011, http://www.3gpp.org/ftp/specs/html-info/36211.htm.

* cited by examiner

*Primary Examiner* — Danh Le
(74) *Attorney, Agent, or Firm* — Procopio, Cory, Hargreaves & Savitch LLP

(57) ABSTRACT

In a distributed antenna system (DAS), the number of physical antennas is usually larger than that of the antenna ports supported by LTE/LTE-A RS pattern in each cell. Systems and methods are directed to a RS transmission scheme in which the RRHs (or RRH groups) are dynamically scheduled and mapped to the antenna ports for RS transmission based on user density distribution such that the accuracy of the channel state information (CSI) estimation in the DAS is optimized.

17 Claims, 16 Drawing Sheets

REFERENCE SIGNAL DESIGN FOR DISTRIBUTED ANTENNA SYSTEMS

BACKGROUND OF THE INVENTION

1. Technical Field

The invention is generally directed to wireless communication systems and more specifically, to a reference signal (RS) transmission scheme.

2. Background Art

Description of RS Patterns for Long Term Evolution (LTE)/Long Term Evolution Advanced (LTE-A) and User Equipment (UE) Channel State Information (CSI) feedback.

In communication systems, Reference Signals (RSs) are predefined symbols which are embedded in the data symbols at the transmitter. Based on the received RSs, the receiver can estimate the channel and feedback the channel state information (CSI) to the transmitter such that it can perform link adaptation accordingly. In particular, for a LTE/LTE-A system, the cell-specific RSs (CRSs) are embedded in a time-frequency two-dimensional lattice. 3GPP TS 36.211 is an example of a system implementing cell-specific RSs (CRSs).

Montojo et al, (US Patent Publication No. 2010/0075706 A1) shows an example of systems and methodologies of creating antenna ports to correspond to two or more groups of user equipment (UEs). Such systems may organize two or more groups of UEs and create a respective antenna port for each of the two or more groups of UEs.

CITATION LIST

Montojo et al., "Reference Signal Design for LTE-A", U.S. Patent Publication Application No. 2010/0075706.
3GPP TS 36.211-3rd Generation Partnership Project Technical Specification Group Radio Access Network Evolved Universal Terrestrial Radio Access (E-UTRA) Physical Channels and Modulation (Release 10), March 2011.

SUMMARY OF THE INVENTION

Technical Problem

Given the foregoing background, high RS overhead is normally required in order to estimate the channel for each antenna as the total number of the antennas is usually large. There is a need for new systems and methods that will substantially obviate this problem associated with the techniques for communication systems. Specifically, there is a need to provide an RS transmission scheme that balances providing good channel estimation accuracy and low system overhead.

Solution to the Problem

Aspects of the present invention may include a method, which may involve determining a User Equipment (UE) density for each of plural groups of Remote Radio Heads (RRHs) in a set of RRHs, selecting one of said RRH groups based on the UE density, and sending a Reference Signal (RS) signal from said selected one of the RRH groups.

Additional aspects of the invention may include a Central Base Station (CBS), which involves a processor arranging a plurality of Remote Radio Heads (RRHs) into a plurality of groups. The CBS selects a RRH group from the plurality of groups for sending out the Reference Signal (RS) according to a process. The process may involve determining a User Equipment (UE) density for each group of Remote Radio Heads (RRHs); and selecting one of the plurality of RRH groups based on the UE density.

Additional aspects of the present invention may include a system involving a Central Base Station (CBS) and a plurality of Remote Radio Heads (RRHs). Each of the RRHs involves a plurality of antennas, wherein the plurality of RRHs are arranged into a plurality of groups by the CBS. The CBS may select one of said plurality of RRH groups for sending out a Reference Signal (RS), the selection conducted according to a process that involves determining a User Equipment (UE) density for each of the plurality of RRH groups; and selecting the one of the plurality of RRH groups based on the UE density.

In a distributed antenna system (DAS), the number of physical antennas is usually larger than that of the antenna ports supported by the LTE/LTE-A RS pattern in each cell. In various embodiments, a RS transmission scheme is implemented in which the RRHs (or RRH groups) are dynamically scheduled and mapped to the antenna ports for RS transmission based on user density distribution such that the accuracy of the channel state information (CSI) estimation in the DAS is optimized.

It is to be understood that both the foregoing and the following descriptions are exemplary and explanatory only and are not intended to limit the claimed invention or application thereof in any manner whatsoever.

Advantageous Effects of the Invention

Embodiments of the invention are designed to provide at least one of the following merits:

A) Provides low system overhead and LTE/LTE-A compatibility by using the RS pattern specified in the LTE/LTE-A cellular standard.

B) Optimizes the channel estimation accuracy of the DAS, especially for the non-uniform user distribution case.

C) Provides low computational complexity, which is linear in the number of RRHs (or RRH groups).

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description of exemplary embodiments, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments as described may be implemented in the form of a software running on a general purpose computer and executed by one or more processors, in the form of a specialized hardware, or combination of software and hardware.

Embodiments utilize a RS transmission scheme by using the RS pattern specified in the LTE/LTE-A cellular standard, which achieves a good balance between the channel estimation accuracy and the system overhead.

FIGS. 1(a) to 1(d) illustrate exemplary time-frequency two-dimensional lattices 100, 101, 102, and 103, utilizing time 110 and frequency 102 in a lattice, where Rk denotes the RSs for antenna port k and the resource elements (REs) marked by X are not used for transmission. As such, RSs for different antenna ports are orthogonal to each other (the RSs for different antennas use different time-frequency grids) and only a limited number of antenna ports (4 for LTE and 8 for LTE-A) are supported in LTE/LTE-A systems. Note that the term "antenna port" is from the LTE/LTE-A standard, which can be mapped to one or multiple physical transmit antennas. A UE estimates the channel for an antenna port, which may be either the channel for one physical antenna or the compound channel for multiple physical antennas mapped to the antenna port.

Such systems can also organize two or more groups of UEs and signal a respective antenna port to each of the two or more groups. Such systems can further communicate mapping information, a reference signal, or a delay related to a linear combination in order to identify antenna ports. Based on such communicated information, the reference signal can be decoded in order to identify each antenna port.

Round-Robin Scheduler

Figure 1A:
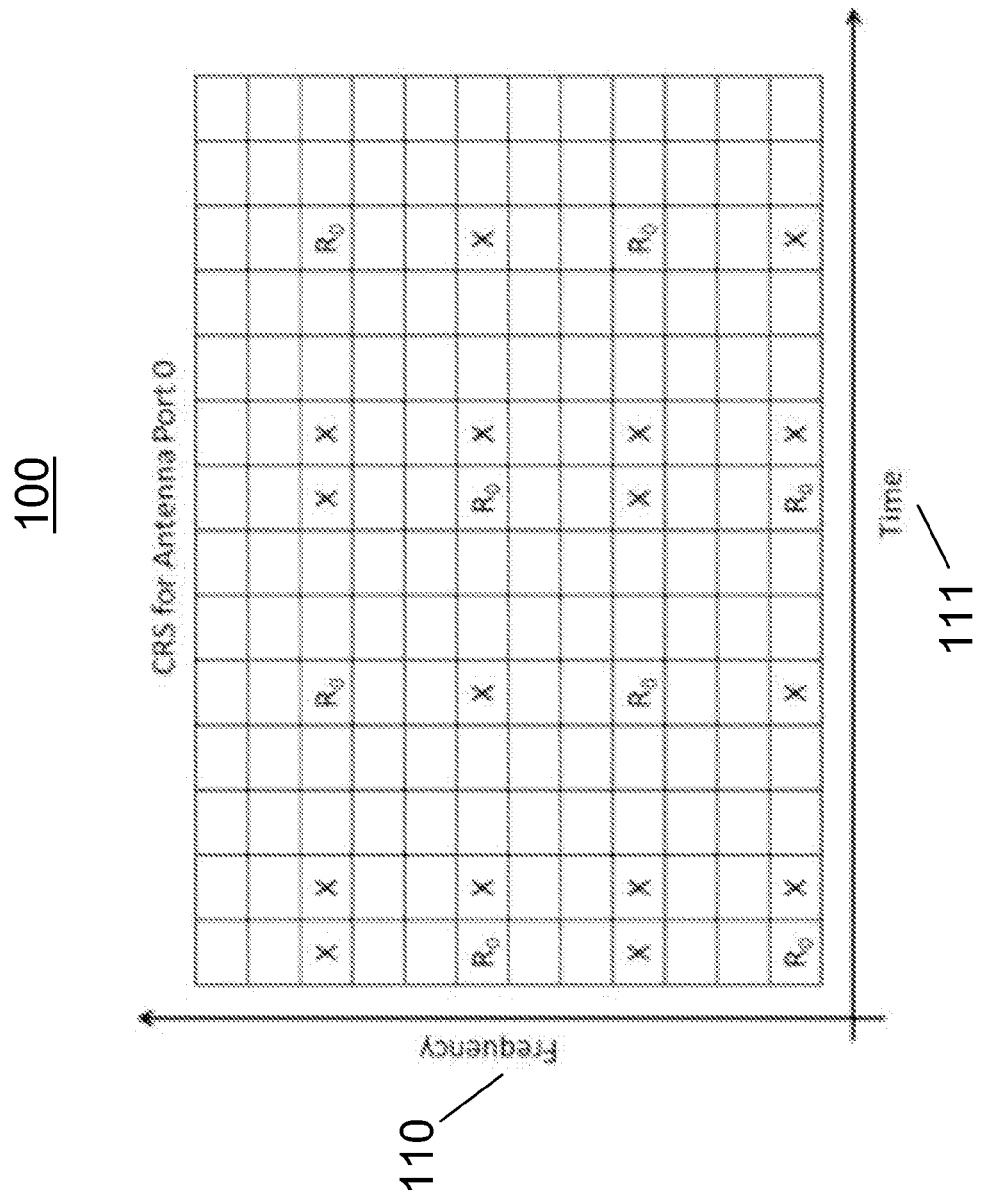
FIGS. 1(a) to 1(d) illustrates exemplary cell-specific RS patterns in LTE/LTE-A systems.
Figure 1B:
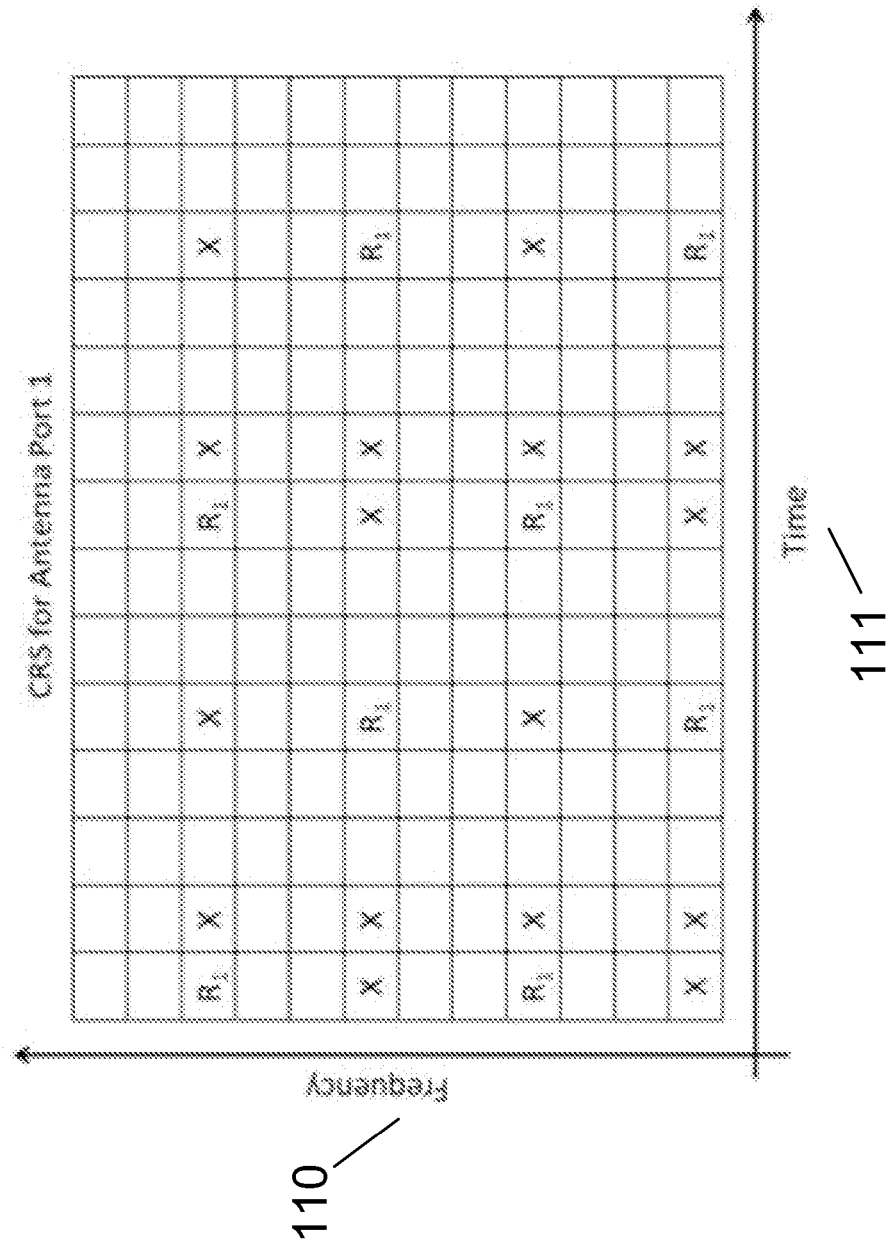
Figure 1C:
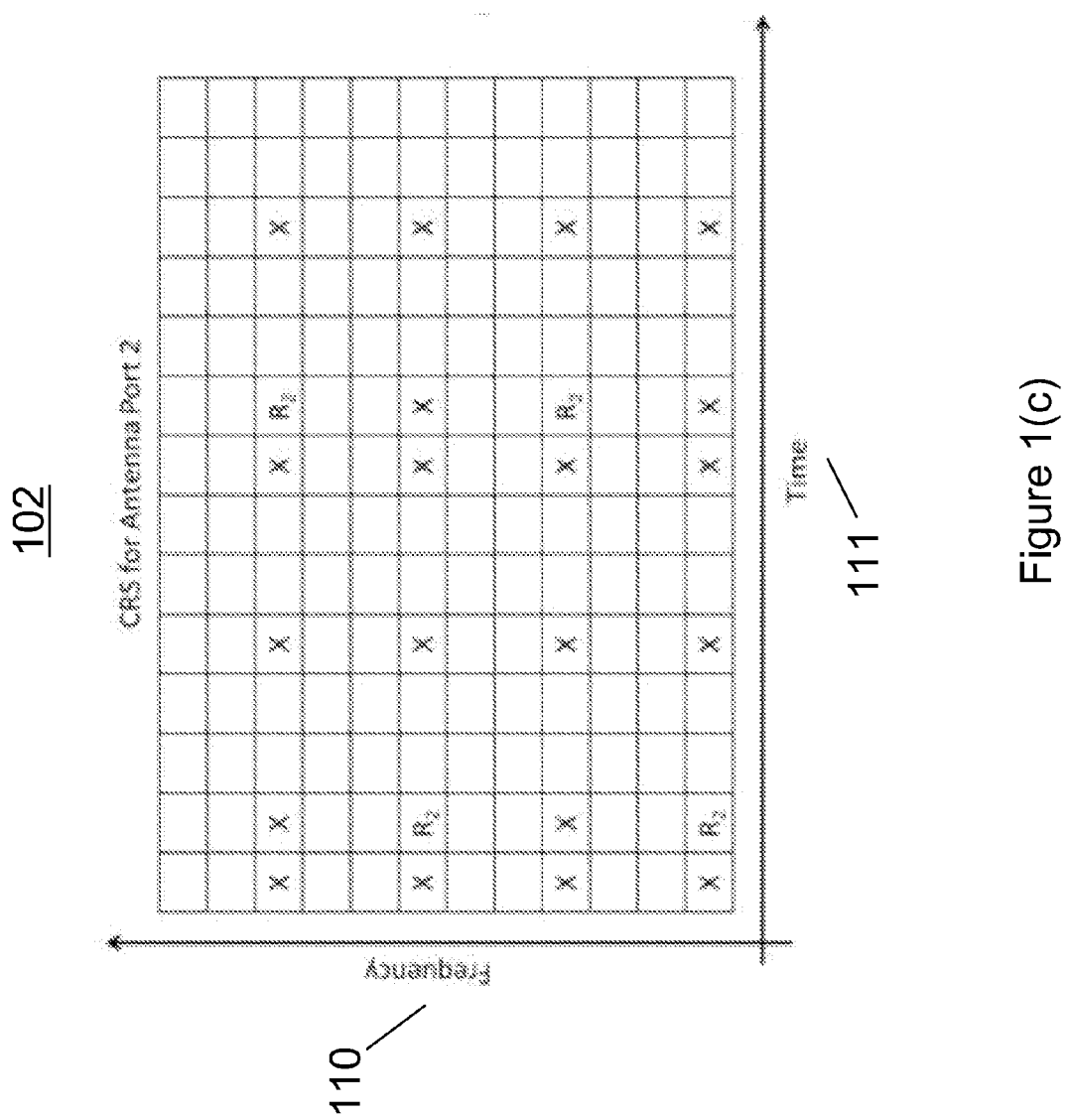
Figure 1D:
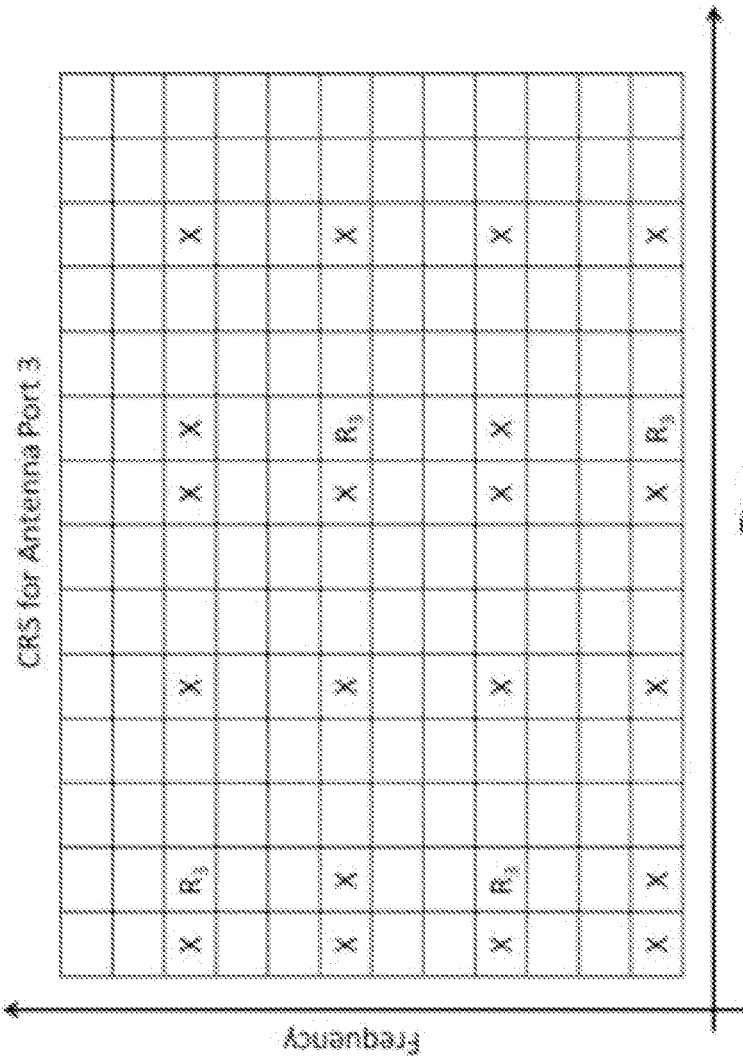
Figure 2:
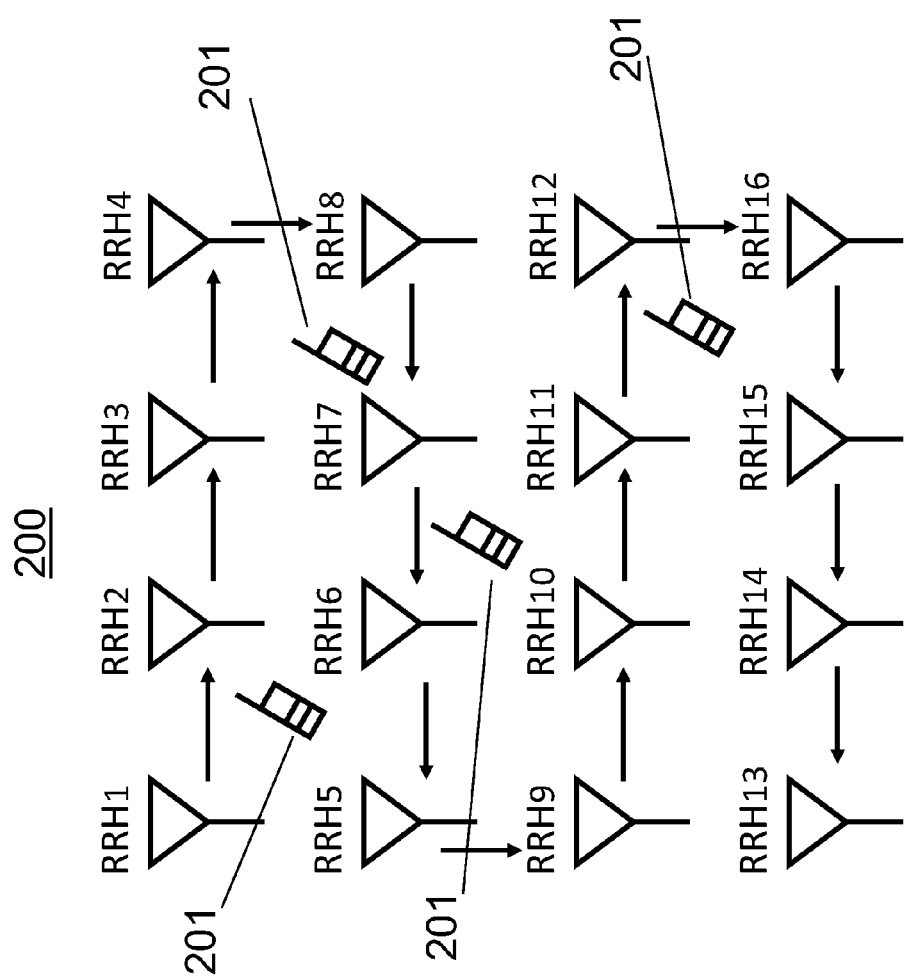
FIG. 2 illustrates an exemplary round-robin scheduler.

FIG. 2 illustrates an exemplary Round-robin scheduler.

Consider a cell with 16 Remote Radio Heads (RRHs), denoted as RRH1 to RRH16 in FIG. 2 (each RRH has multiple transmit antennas), and multiple UEs 201, where a Central Base Station (CBS) needs to know the CSI for each RRH-UE pair within the cell. Given the limitation of the antenna ports and UE feedback in LTE/LTE-A specifications, only one RRH could transmit the RSs at each time. A round-robin scheduler 200 can be used here, in which the RRHs take turns to transmit the RSs. As such, the CSI at a UE for each RRH can be updated every N time slots, where N is the number of the RRHs within the cell. However, the round-robin scheduler is only suitable for the scenario with uniform UE distribution.

Additionally, the reference signal (RS) design issue is considered in a distributed antenna system (DAS), in which multiple RRHs, i.e., dummy antennas, are uniformly distributed in a region and controlled by the CBS. In order to estimate the channel for each antenna, high RS overhead is required due to the fact that the total number of the antennas is usually large.

Figure 3:
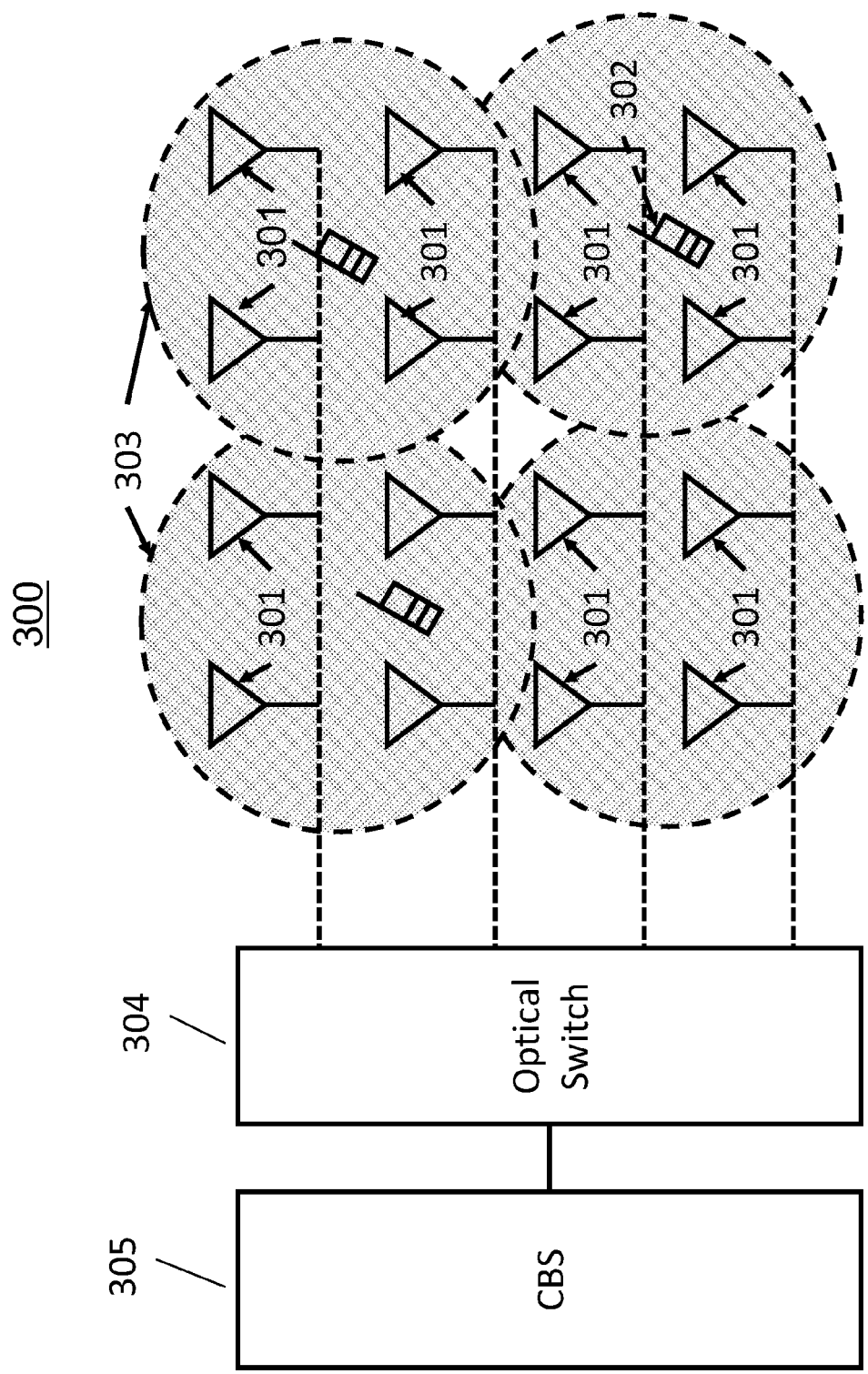
FIG. 3 illustrates an exemplary distributed antenna system (DAS).

FIG. 3 illustrates an exemplary distributed antenna system (DAS), in accordance with exemplary embodiments.

Consider a DAS 300 where multiple RRHs 301, each having one or multiple dummy antennas, are uniformly deployed in a geographical region such as an office space, with one or more UEs 302 within the range of a cell 303. The RRHs 301 are connected via an optical switch 304 to a central base station (CBS) 305 and controlled by the CBS for signal transmissions and receptions.

Figure 4:
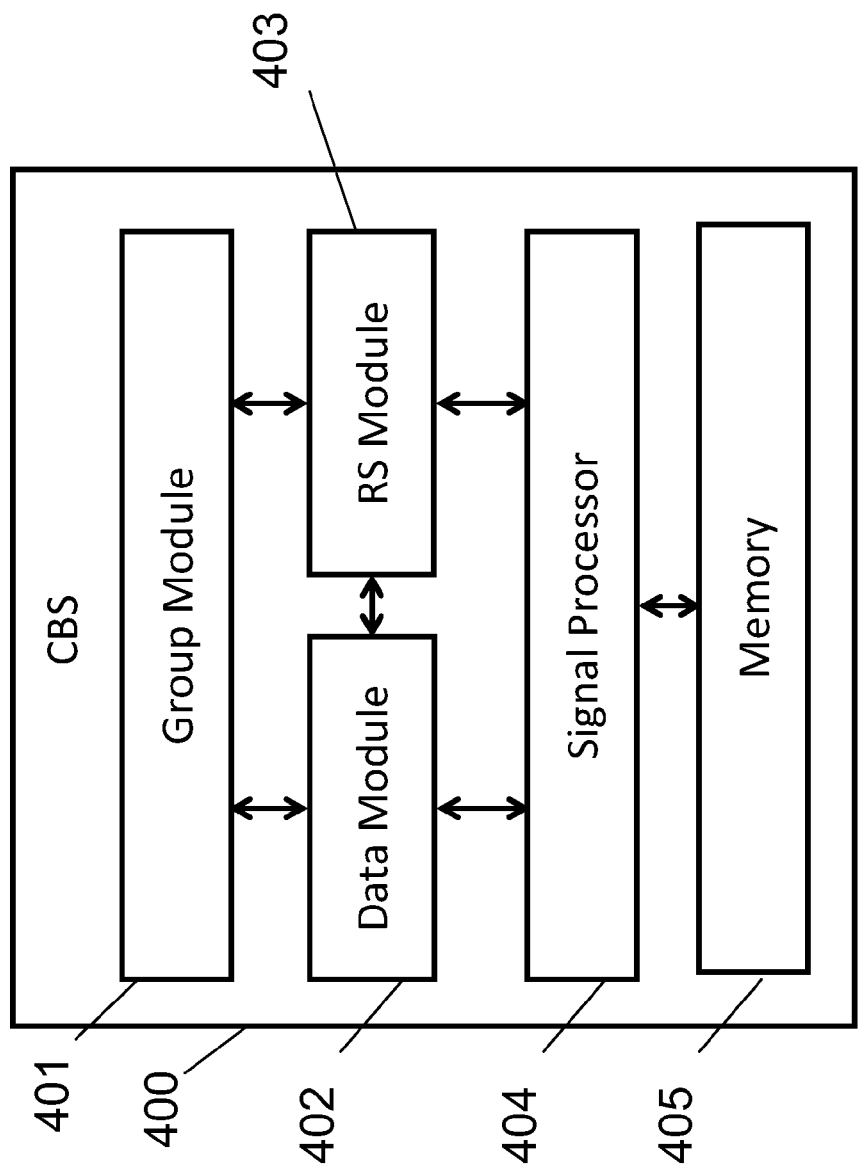
FIG. 4 illustrates an exemplary block diagram of the centralized base station (CBS) according to an exemplary embodiment.

FIG. 4 illustrates an exemplary block diagram of the CBS.

The CBS utilizes a group module 401, data module 402, RS module 403, signal processor 404, and memory 405. In the following, the data/RS transmission process is described as well as the functionality of each CBS block.

The RRHs are grouped into cells by the CBS group module 401 to facilitate RS design and data transmissions. The UEs that are associated with a cell are jointly served by the RRHs within the cell. The cell formulation can be either pre-determined before the data transmission process or configured jointly with UE scheduling during the data transmission process.

The data transmission is divided into frames over time. In each frame, the CBS schedules RRHs and UEs for data transmission (controlled by the data module 402) in each cell based on UEs' feedback of the estimated CSI. Given the time-varying property of wireless channels, the accuracy of the CSI estimation for a particular RRH (or RRH group) depends on how frequently a UE receives the RSs from the RRH (or RRH group). Thus, the RS design (controlled by the RS module 403) is the key in developing an efficient DAS.

RS module 403 executes the RS transmission scheme based on the information of the measurement set from data module 402.

Signal processor 404 and memory 405 are hardware supports for modules 402 and 403, which execute the signal processing for data and RS transmissions.

The following focuses on the RS design in a DAS cell.

Consider the RS design in a cell of a DAS. Let N and Nt denotes the numbers of the RRHs within the cell and the transmit antennas for each RRH, respectively. In order to obtain the CSI of all RRHs, ideally speaking, a RS pattern needs to be designed that can support N×Nt antenna ports (i.e. each port is mapped to a particular physical antenna).

However, this ideal RS design incurs high system overhead, especially when N is a large number. In order to reduce the RS overhead, the system use the RS pattern specified in the LTE/LTE-A standard, which can only support up to M antenna ports (M=4 for LTE and M=8 for LTE-A) and thus has low system overhead. However, with the limited number of the antenna ports, it is difficult to conduct the one-to-one mapping between antenna ports and physical antennas, as in the ideal case. There are two possible ways to deal with this problem, which are explained as follows.

One way is to group N RRHs into M groups such that each RRH group can map to a particular RS antenna port. The problem with this solution is that a UE can only obtain and feedback CSI for the compound channel of each RRH group but not the CSI for each RRH. This kind of CSI may not be useful since the RRHs in a group may not serve the UE jointly in the later data transmission.

Figure 5A:
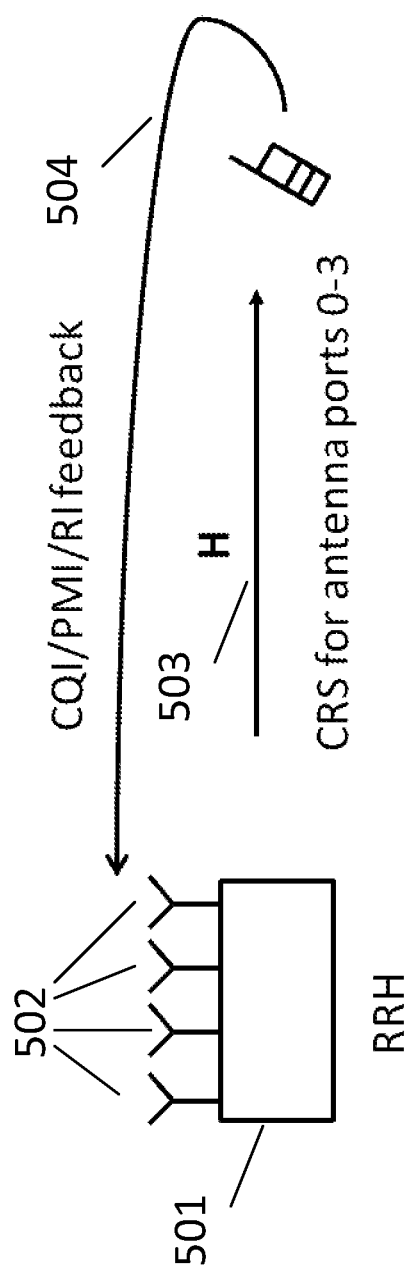
FIG. 5 illustrates an exemplary compound channel according to an exemplary embodiment.

FIG. 5(a) illustrates an example of four RS ports 502 used for one RRH 501, and a UE 505. In the example as shown in FIG. 5(a), the CBS can obtain the knowledge of H 503 and the CRSs of the antenna ports with the CSI feedback 504, including channel quality indicator (CQI) feedback, precoding matrix index (PMI) feedback, and rank indicator (RI) feedback.

Figure 5B:
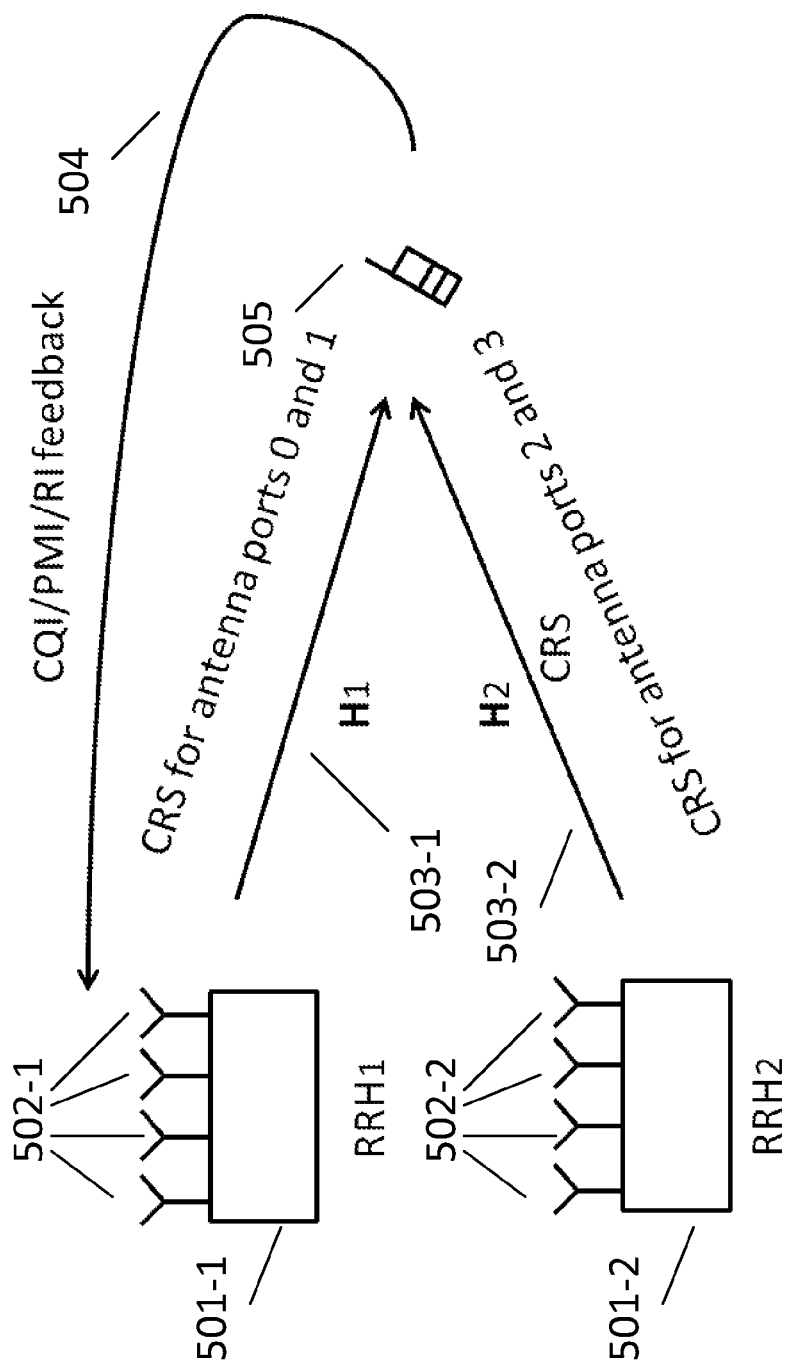

FIG. 5(b) illustrates an example of four RS ports 502-1, 502-2 used for two RRHs 501-1 501-2, and a UE 505. In the example as shown in FIG. 5(b), the CBS can only obtain a CSI for the compound channel of H1 and H2.

Another way is to assign one RRH to transmit the RS while using all antenna ports at each time and switch RRHs over time. The CBS could obtain the CSI for each RRH one by one and finally gather the CSI for all RRHs. The drawback of this scheme is that the CSI update interval for each RRH increases with the number of RRHs in the cell. The system will optimize the average CSI update intervals over UEs which is further explained below. The round-robin scheduler mentioned in a previous section could be a candidate, which leads to an average CSI update interval of N without considering the UE distribution.

Figure 6:
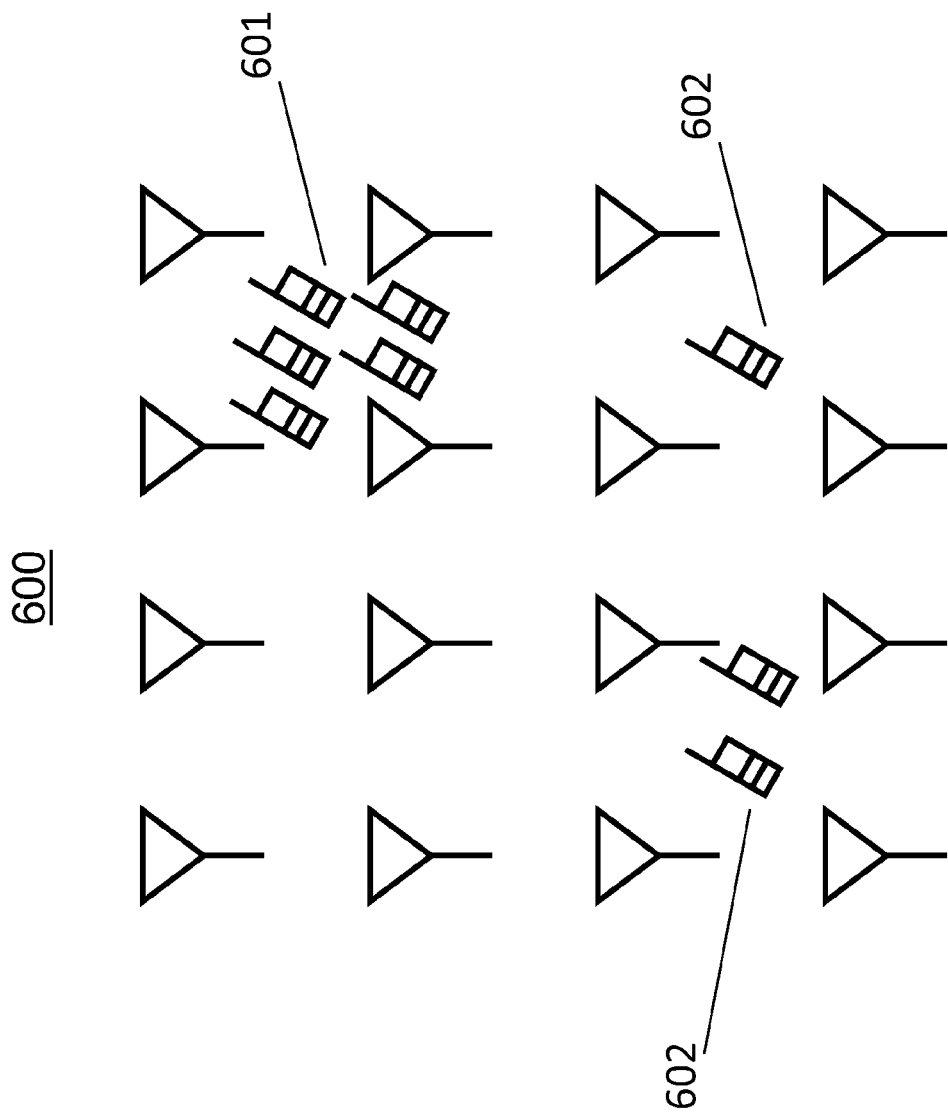
FIG. 6 illustrates an example of non-uniform UE distribution on which an exemplary embodiment may be implemented.

FIG. 6 illustrates an example of non-uniform UE distribution. When UEs are non-uniformly distributed in the area 600, the CBS may want to update the CSI for the RRHs with high UE density 601 more frequently, such that the average CSI update interval (over the total number of UEs) could be reduced. At the same time, the CBS needs to maintain the update interval for all RRHs less than a certain threshold in order to guarantee the CSI knowledge for those RRHs with low UE density 602 is always valid, i.e., not outdated. In the next section, a scheme is described, which has a good balance between the above two aspects. The density for a particular RRH (or RRH group) is determined, for example, as the number of the UEs associated with it as explained below. The system may utilize a scheduling scheme for the RRHs of a cell to send RSs such that the average CSI update interval over UEs is minimized under the constraint that the CSI update intervals for all RRHs are below a certain pre-defined threshold with high probability. Therefore, the update interval is reduced as the UE density for the RRH group becomes higher.

Figure 7A:
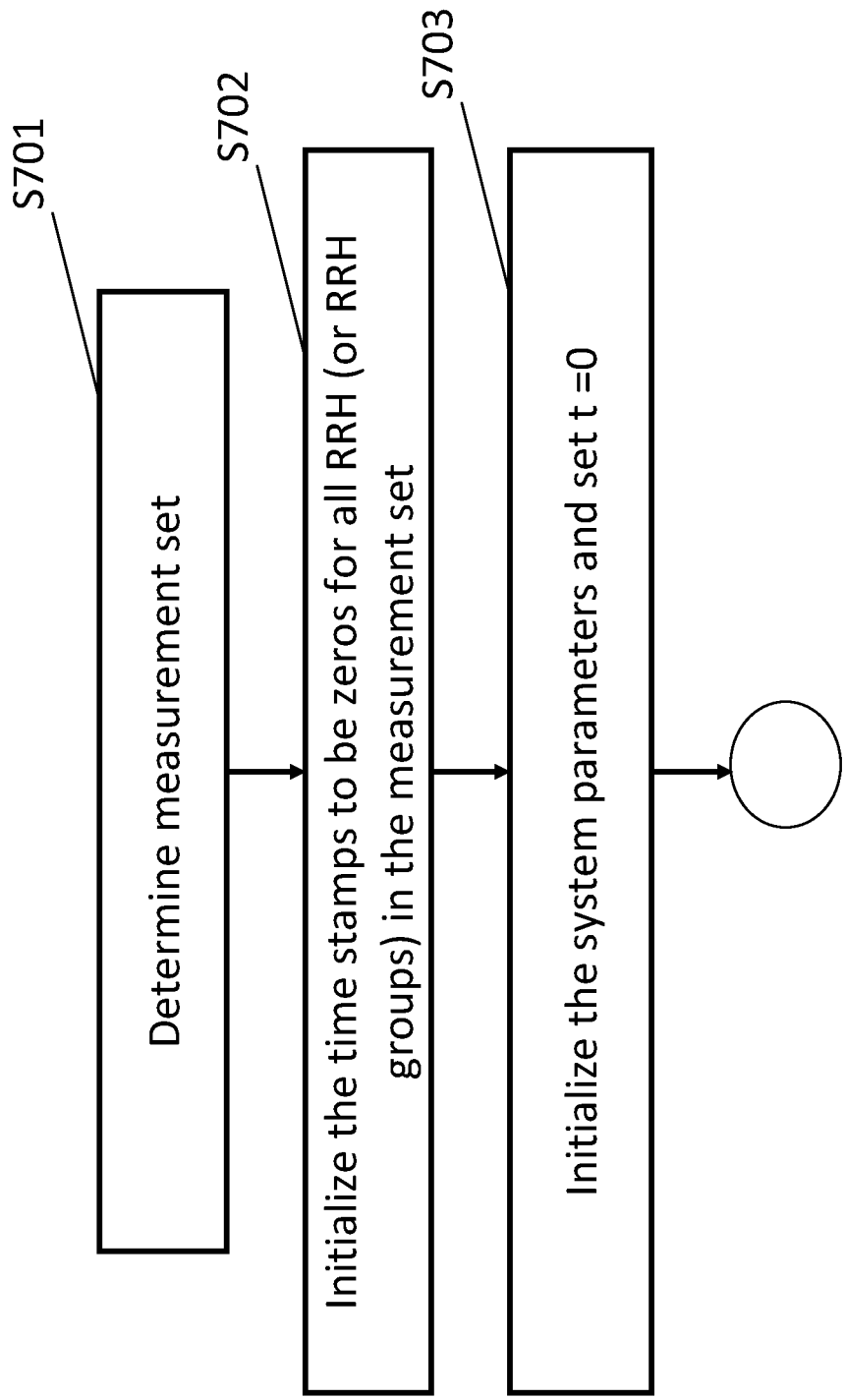
FIGS. 7(a) to 7(c) illustrate an exemplary flowchart according to an exemplary embodiment.
Figure 7B:
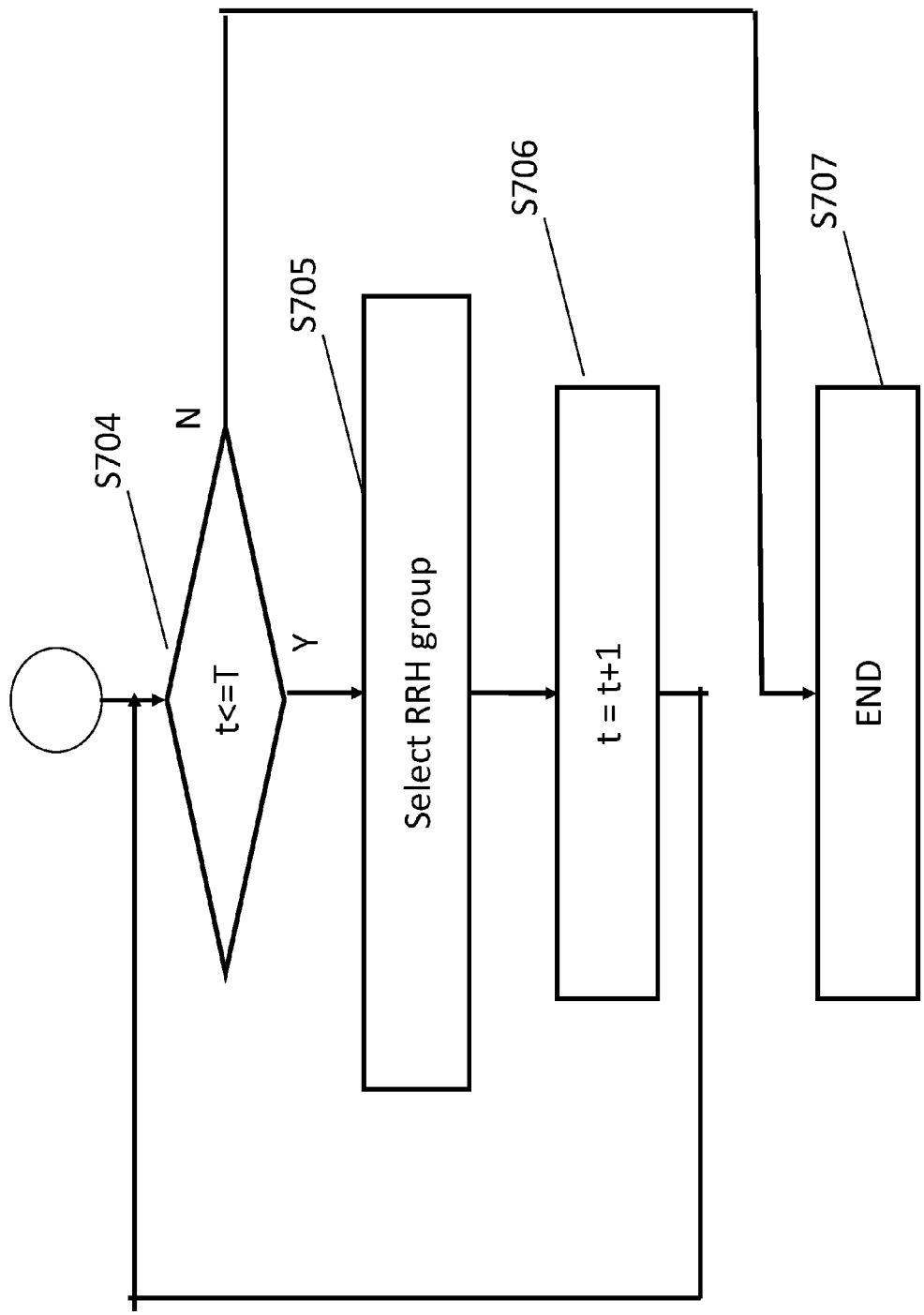
Figure 7C:
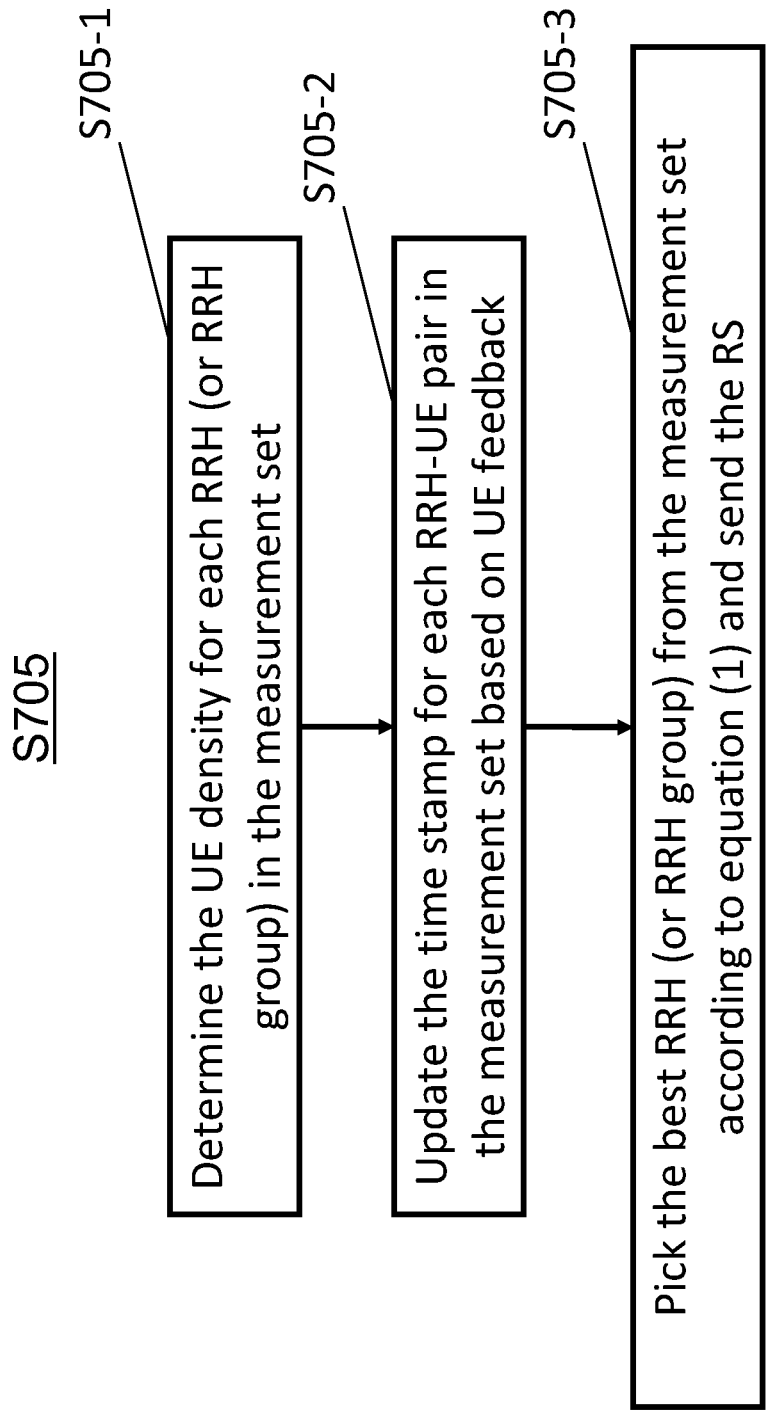

FIGS. 7(a) to 7(c) illustrates an exemplary flowchart of an implementation of an exemplary embodiment. Each step is explained in details in the following.

Step S701: CBS data module 402 determines a measurement set S. The measurement set is the set consisting of the RRHs or RRH groups, whose CSI for all UEs is required to be known at the CBS for data transmission. The measurement set can be either predetermined at the beginning of the data transmission process or updated in a real-time manner by the CBS data module during the data transmission process. Note that the measurement set is chosen such that each RRH or RRH group in the set requires of using all RS antenna ports for channel estimation.

After Step S701, CBS RS module 403 executes the following steps.

Step S702: Initialize the time stamps to be zeros for all RRH (or RRH groups) in the measurement set.

Step S703: Initialize the system parameters α, β, γ, and δ as shown in equation (1), which need to be chosen appropriately in order to optimize the performance. Set the maximal allowable CQI update interval $T_{max}$ for the RRHs (or RRH groups) in measurement set S. Also set the time stamp $T_{mk}=0$ for all m=1, 2, . . . , M and k=1, 2, . . . , K, where M and K are the size of measurement set S and the total number of UEs, respectively.

Step S704: Execute a loop for each frame until the last one (total T frames).

Step S705: Select a RRH group. The RRH group may be selected based on the process shown in FIG. 7(c).

Step S705-1: Determine the UE density for each RRH (or RRH group) in the measurement set, i.e., the number of the UEs associated with each RRH (or RRH group). Note that the CBS could track the UE density for each RRH (RRH group) as follows: The CBS monitors the uplink received power of each UE at each RRH (RRH group) and then updates the number of UEs associated to each RRH (RRH group) by assuming that a UE is associated to the RRH (RRH group) with the highest received power. Let $P_m$ denote the UE density for the m-th RRH (or RRH group) in measurement set S.

Step S705-2: Update the time stamp for each RRH-UE (or RRH-group-UE) pair in the measurement set based on UE feedback. If the CBS received the CSI feedback from the k-th UE for the m-th RRH (or RRH group) in measurement set S, set $T_{mk}=0$; otherwise, set $T_{mk}=T_{mk}+1$.

Step S705-3: Pick the m*-th RRH (or RRH group) in measurement set S according to the following equation from the measurement set and send the RSs through the selected RRH (or RRH group).

$$m^* = \arg\max\left(\alpha P_m^\gamma + \frac{\beta}{T_{max} - \max_k T_{mk} + \delta}\right) \quad (1)$$

Step S706: CBS data module 402 increments the loop counter.

Step S707: CBS data module 402 finishes for loop.

Figure 8:
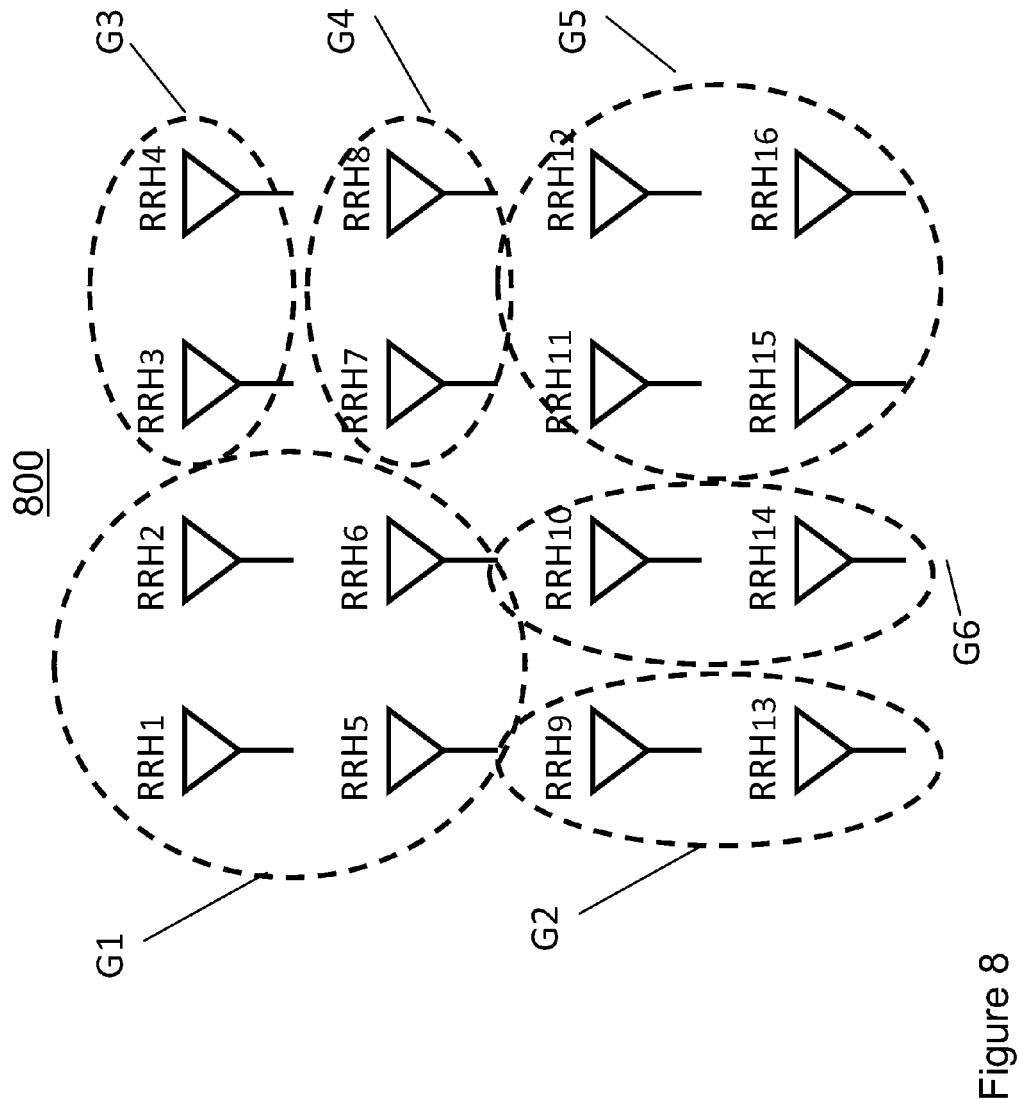
FIG. 8 illustrates an example of a measurement set on which an exemplary embodiment may be implemented.

FIG. 8 illustrates an example of a measurement set.

Consider an example of a cell with 16 RRHs, labeled RRH1 to RRH16 as shown in FIG. 8. The basic measurement set is S={RRH$_1$, RRH$_2$, . . . , RRH$_{16}$}, where the CQI for all RRH-UE pairs requires to be known at the CBS. The CBS data module can also set S={{RRH$_1$, RRH$_2$, RRH$_5$, RRH$_6$}, {RRH$_{11}$, RRH$_{12}$, RRH$_{15}$, RRH$_{16}$}, {RRH$_3$, RRH$_4$} {RRH$_7$, RRH$_8$}, {RRH$_9$, RRH$_{13}$}, {RRH$_{10}$, RRH$_{14}$}}, which means it only needs the CQI of the compound channels for the six RRH groups (G1 to G6 in this case).

The groups can be determined by any RRH clustering algorithm by the group module 401. However, it is preferable to utilize a joint UE scheduling and clustering algorithm in order to increase the achievable rates of the UEs at minimal implementation complexity. One example is to schedule the UEs according to the order of the users in decreasing values of proportional fair scheduling metrics; and for each UE being scheduled according to the order of the UE, pick up a first N number of RRHs which have not been picked up previously (in decreasing order of signal strength to the UE being scheduled) to form a cluster of size N for the UE being scheduled. For example, the RRHs can be ordered in decreasing order of signal strength as vector S(i, j) to each UE UE(i), where i equals 1 to total number of UEs K, and where j equals 1 to total number of RRHs in decreasing order of signal strength. By picking up the first N number of RRHs per cluster, this allows for an efficient grouping method while ensuring that each UE is tied to a particular cluster.

The performance of an implementation of an exemplary embodiment is compared to the round-robin scheme in terms of average CSI update interval and outage probability. An outage event occurs when the update interval for any RRH-UE pair (or RRH Group-UE pair) is above the given threshold $T_{max}$. A lower outage probability means better performance. In the simulation, the basic measurement set is used, which includes all RRHs in a cell. Let N and K denote the numbers of RRHs and UEs in the cell, respectively, where we set K=10N. The UEs are dropped uniformly in a cell in such a way that 25% of RRHs are associated with UEs of density $d_1$ and 75% of RRHs are associated with UEs of density $d_2$, where $d_1=10d_2$. The threshold $T_{max}$ is set to be 1.2N, where N is the cell size. Other simulation parameters are set as follows: $\alpha=1$, $\beta=0.0013$, $\gamma=1.5$, and $\delta=1e-10$.

Figure 9:
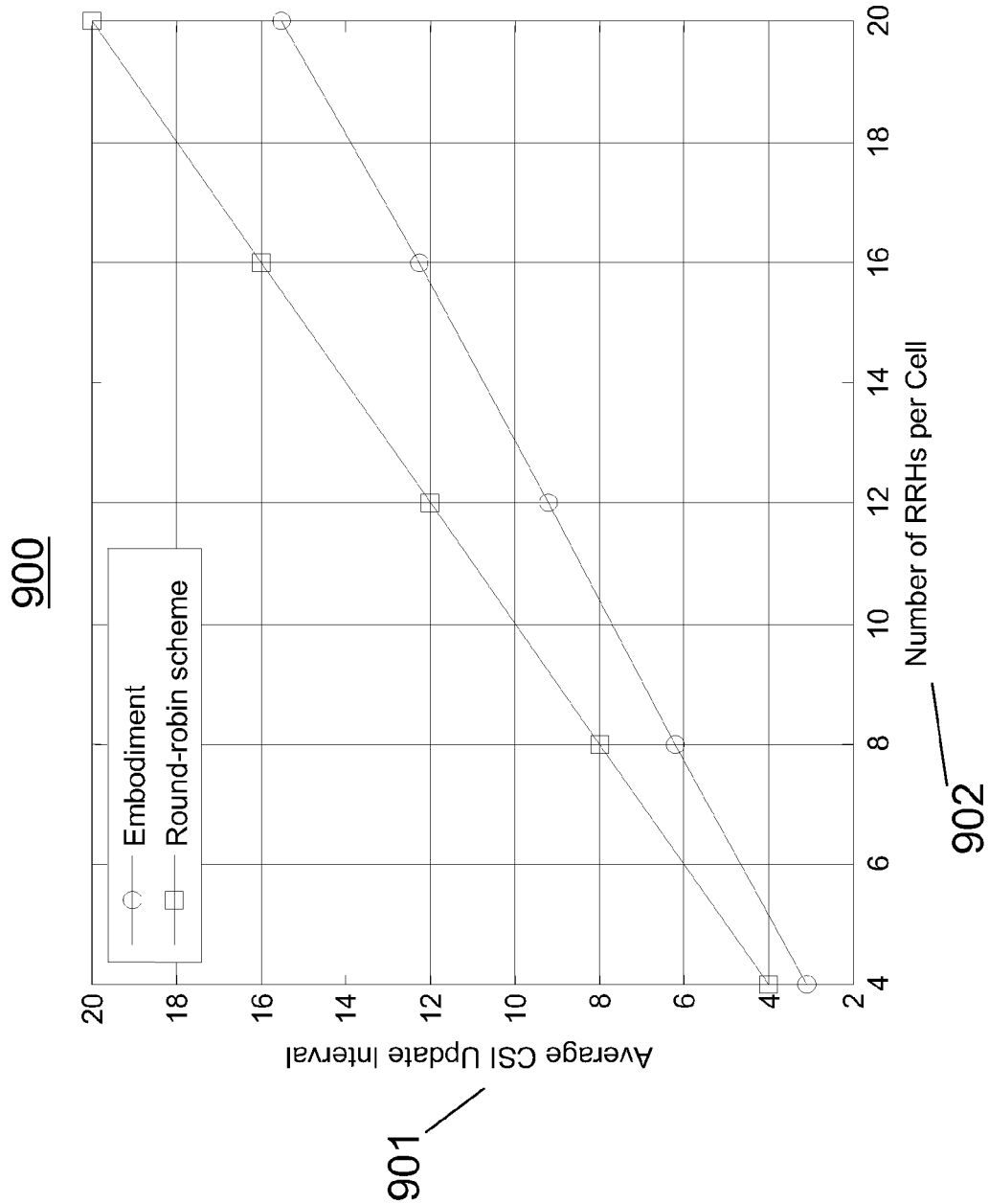
FIG. 9 illustrates a performance comparison between an exemplary embodiment and a round-robin scheme.

FIG. 9 illustrates the performance comparison of an exemplary implementation of an embodiment and the round robin scheme from a computer simulation 900. The average CSI update interval 901 of the proposed scheme is compared to that of the round-robin scheme over different values of cell size 902. The example implementation can achieve roughly 20% lower average CSI update interval (the lower the better) compared to the round-robin scheme. The UEs can estimate and feedback CSI more accurately to the CBS as the average CSI update interval becomes lower.

Figure 10:
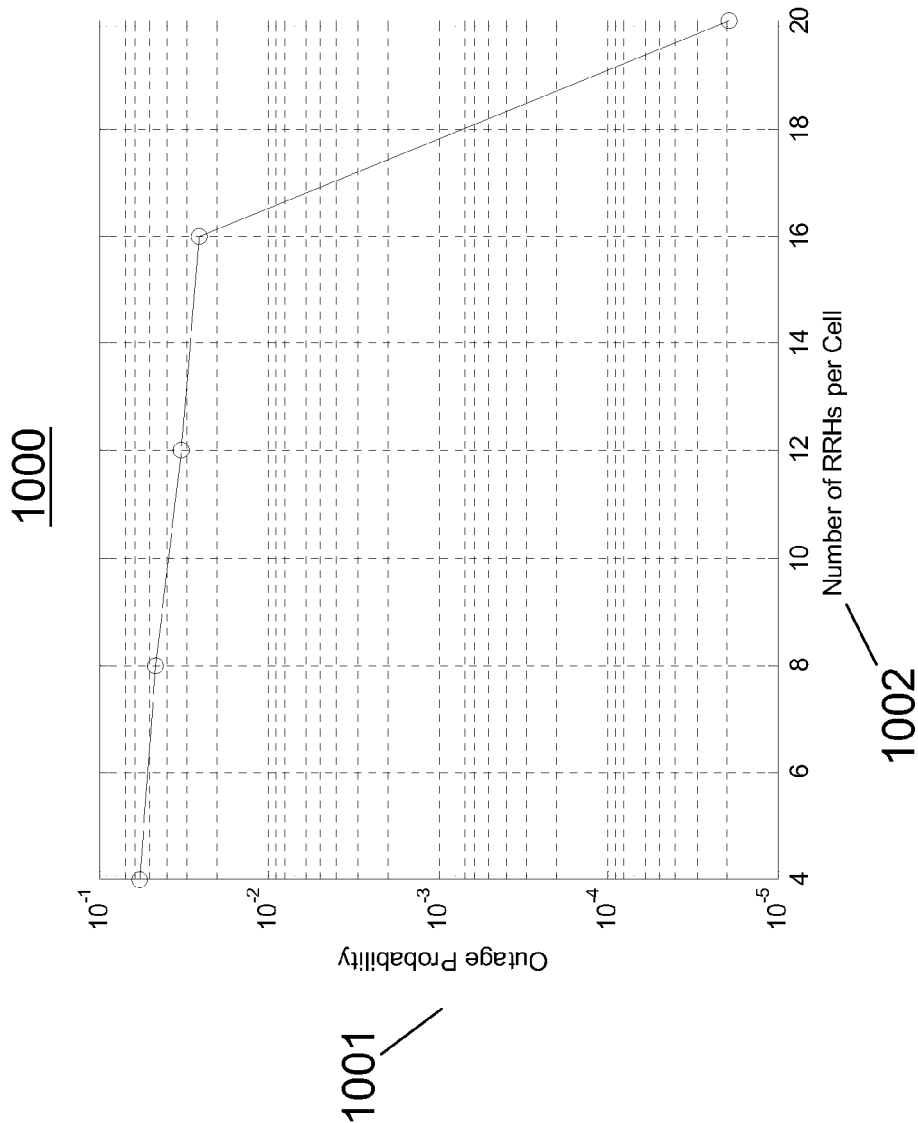
FIG. 10 illustrates the outage probability of an exemplary embodiment.

FIG. 10 illustrates the outage probability of an exemplary implementation of an embodiment 1000. The outage probability 1001 is plot over different values of cell size 1002. FIG. 10 illustrates that the outage probability is below 0.05 for all cell sizes and is negligible for a large cell size. Note that the outage probability for the round-robin scheme is always zero for the configuration of $T_{max}$ in this exemplary implementation.

If the UEs are uniformly distributed, the exemplary implementation has the same performance as the round-robin scheme, since the UE density of all RRHs in the measurement set is the same in this scenario.

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the invention will be apparent to those skilled in the art from consideration of the specification and practice of the invention disclosed herein. Various aspects and/or components of the described embodiments may be used singly or in any combination in a communication system. It is intended that the specification and examples be considered as exemplary only, with a true scope and spirit of the invention being indicated by the following claims.

What is claimed is:

1. A method, comprising:
   determining a User Equipment (UE) density for each of plural groups of Remote Radio Heads (RRHs) in a set of RRHs, wherein the UE density for said each of the plural groups of RRHs indicates a number of UEs associated with said each of the plural groups of RRHs;
   selecting one of said RRH groups based on the UE density; and
   sending a Reference Signal (RS) from said one of said RRH groups selected based on the UE density, to UEs associated with said one of the RRH groups selected based on the UE density.

2. The method of claim 1, wherein an update interval of said each of the plural groups of RRHs for sending the RS is changed according to the UE density of said each of the plural groups of RRHs.

3. The method of claim 2, wherein the update interval of said each of the plural groups of RRHs for sending the RS becomes shorter as the UE density of said each of the plural groups of RRHs becomes higher.

4. The method of claim 1, further comprising forming said each RRH group from the set of RRHs, the forming comprising:
   scheduling UEs according to an order of said UEs in decreasing values of proportional fair scheduling metrics;
   for each UE being scheduled according to the order of the UEs, select a number of RRHs from said set of RRHs, in decreasing order of signal strength to said UE being scheduled, to form one of each said RRH group.

5. The method of claim 1, wherein the selecting one of each said RRH group (m*) is conducted in accordance to an equation:

$$m^* = \arg\max_m \left( \alpha P_m^\gamma + \frac{\beta}{T_{max} - \max_k T_{mk} + \delta} \right)$$

wherein α is a first parameter for weighing the UE density of said each RRH group;

wherein γ is a second parameter for weighing the UE density of said each RRH group;

wherein β is a third parameter for weighing a time stamp of said each RRH group;

wherein δ is a fourth parameter for weighing the time stamp of said each RRH group;

wherein $T_{mk}$ is a time stamp for UE k in RRH group m from said each RRH group;

wherein $P_m$ is UE density for the RRH group m from said each RRH group;

wherein $T_{max}$ is a maximum threshold for the time stamp of one of said each RRH group.

6. The method of claim 1, wherein the selecting the one of said RRH groups based on the UE density is conducted by a base station.

7. The method of claim 1, further comprising setting a fixed pattern as the RS for transmission.

8. A system, comprising:

a Central Base Station (CBS); and a plurality of Remote Radio Heads (RRHs), each of said RRHs comprising a plurality of antennas, wherein said plurality of RRHs are arranged into a plurality of groups by the CBS;

wherein the CBS selects one of said plurality of RRH groups for sending out a Reference Signal (RS) to UEs associated with the selected one of said plurality of the RRH groups, the selection conducted according to a process comprising:

determining a User Equipment (UE) density for each of said plurality of RRH groups, wherein the UE density for said each of the plurality of the RRH groups indicates a number of UEs associated with said each of the plurality of the RRH groups; and selecting said one of the plurality of RRH groups based on the UE density.

9. The system of claim 8, wherein an update interval of said each of the plural groups of RRHs for sending the RS is changed according to the UE density of said each of the plural groups of RRHs.

10. The system of claim 9, wherein the update interval of said each of the plural groups of RRHs for sending the RS becomes shorter as the UE density of said each of the plural groups of RRHs becomes higher.

11. The system of claim 8, wherein the CBS determines each RRH group by a process comprising:

scheduling UEs according to an order of said UEs in decreasing values of proportional fair scheduling metrics;

for each UE being scheduled according to the order of the UEs, select a number of RRHs from said plurality of RRHs, in decreasing order of signal strength to said UE being scheduled, to form one of each said RRH group.

12. The system of claim 8, wherein the selecting one of said each RRH group (m*) is conducted in accordance to an equation:

$$m^* = \arg\max_m \left( \alpha P_m^\gamma + \frac{\beta}{T_{max} - \max_k T_{mk} + \delta} \right)$$

wherein α is a first parameter for weighing the UE density of said each RRH group;

wherein γ is a second parameter for weighing the UE density of said each RRH group;

wherein β is a third parameter for weighing a time stamp of said each RRH group;

wherein δ is a fourth parameter for weighing the time stamp of said each RRH group;

wherein $T_{mk}$ is a time stamp for UE k in RRH group m from said each RRH group;

wherein $P_m$ is UE density for the RRH group m from said each RRH group;

wherein $T_{max}$ is a maximum threshold for the time stamp of one of said each RRH group.

13. A Central Base Station (CBS), comprising:

a processor arranging a plurality of Remote Radio Heads (RRHs) into a plurality of groups;

wherein the CBS selects a RRH group from said plurality of groups for sending out a Reference Signal (RS) to UEs associated with the selected RRH group, according to a process comprising:

determining a User Equipment (UE) density for each of the plurality of RRH groups, wherein the UE density for said each of the plurality of the RRH groups indicates a number of UEs associated with said each of the plurality of the RRH group; and selecting one of said plurality of RRH groups based on the UE density.

14. The CBS of claim 13, wherein an update interval of said each of the plural groups of RRHs for sending the RS is changed according to the UE density of said each of the plural groups of RRHs.

15. The CBS of claim 14, wherein the update interval of said each of the plural groups of RRHs for sending the RS becomes shorter as the UE density of said each of the plural groups of RRHs becomes higher.

16. The CBS of claim 13, wherein the CBS arranges said plurality of Remote Radio Heads (RRHs) into said plurality of groups by a process comprising:

scheduling UEs according to an order of said UEs in decreasing values of proportional fair scheduling metrics;

for each UE being scheduled according to the order of the UEs, selecting a first number of RRHs, in decreasing order of signal strength to said UE being scheduled, to form one of said plurality of RRH groups for the UE being scheduled.

17. The CBS of claim 13, wherein the selecting one of said each RRH group (m*) is conducted in accordance to an equation:

$$m^* = \arg\max_m \left( \alpha P_m^\gamma + \frac{\beta}{T_{max} - \max_k T_{mk} + \delta} \right)$$

wherein α is a first parameter for weighing the UE density of said each RRH group;

wherein γ is a second parameter for weighing the UE density of said each RRH group;

wherein β is a third parameter for weighing a time stamp of said each RRH group;

wherein δ is a fourth parameter for weighing the time stamp of said each RRH group;
wherein $T_{mk}$ is a time stamp for UE k in RRH group m from said each RRH group;
wherein $P_m$ is UE density for the RRH group m from said each RRH group;
wherein $T_{max}$ is a maximum threshold for the time stamp of one of said each RRH group.

\* \* \* \* \*